(12) United States Patent
Choi et al.

(10) Patent No.: US 12,096,539 B2
(45) Date of Patent: Sep. 17, 2024

(54) COOKING APPARATUS AND CONTROL METHOD THEREFOR

(71) Applicant: SAMSUNG ELECTRONICS CO., LTD., Suwon-Si Gyeonggi-do (KR)

(72) Inventors: Jiwoong Choi, Suwon-si (KR); Namju Park, Suwon-si (KR); Changsun Yun, Suwon-si (KR); Hyunkwan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 756 days.

(21) Appl. No.: 17/284,705

(22) PCT Filed: Oct. 8, 2019

(86) PCT No.: PCT/KR2019/013177
§ 371 (c)(1),
(2) Date: Apr. 12, 2021

(87) PCT Pub. No.: WO2020/080725
PCT Pub. Date: Apr. 23, 2020

(65) Prior Publication Data
US 2021/0352774 A1   Nov. 11, 2021

(30) Foreign Application Priority Data

Oct. 18, 2018   (KR) .................. 10-2018-0124190

(51) Int. Cl.
*H05B 6/06* (2006.01)
*H02M 1/00* (2007.01)
(Continued)

(52) U.S. Cl.
CPC ............ *H05B 6/065* (2013.01); *H02M 7/493* (2013.01); *H02M 7/5387* (2013.01); *H05B 6/04* (2013.01);
(Continued)

(58) Field of Classification Search
CPC .... H02J 50/10; H02M 1/0009; H02M 1/0043; H02M 1/008; H02M 7/4815;
(Continued)

(56) References Cited

U.S. PATENT DOCUMENTS

| | | |
|---|---|---|
| 7,910,865 B2 | 3/2011 | Haag et al. |
| 8,686,321 B2 | 4/2014 | Parachini et al. |

(Continued)

FOREIGN PATENT DOCUMENTS

| | | |
|---|---|---|
| EP | 1 951 003 A1 | 7/2008 |
| EP | 2 469 970 A2 | 6/2012 |

(Continued)

OTHER PUBLICATIONS

Office Action dated Sep. 8, 2023, in Korean Application No. 10-2018-0124190.

(Continued)

*Primary Examiner* — Dana Ross
*Assistant Examiner* — James F Sims, III
(74) *Attorney, Agent, or Firm* — STAAS & HALSEY LLP

(57) ABSTRACT

A control method for a cooking apparatus is disclosed. The disclosed control method for the cooking apparatus comprises the steps of: receiving an input of an output level for a heating coil; determining a plurality of driving frequencies for a driving power on the basis of the output level; generating a driving power alternately having the plurality of determined driving frequencies; and providing the generated driving power to the heating coil.

11 Claims, 10 Drawing Sheets

(51) Int. Cl.
*H02M 7/493* (2007.01)
*H02M 7/5387* (2007.01)
*H05B 6/04* (2006.01)
*H05B 6/12* (2006.01)

(52) U.S. Cl.
CPC ......... *H05B 6/1272* (2013.01); *H02M 1/0009* (2021.05); *H02M 1/0043* (2021.05)

(58) Field of Classification Search
CPC ...... H02M 7/493; H02M 7/5387; H05B 6/04; H05B 6/065; H05B 6/1272; Y02B 70/10
USPC ........................................................ 219/621
See application file for complete search history.

(56) References Cited

U.S. PATENT DOCUMENTS

| | | | |
|---|---|---|---|
| 10,159,117 B2 | 12/2018 | Ono et al. | |
| 2015/0237680 A1* | 8/2015 | Ono .................. | G01R 21/06 219/662 |

FOREIGN PATENT DOCUMENTS

| | | |
|---|---|---|
| EP | 2 469 972 A1 | 6/2012 |
| EP | 2 911 472 A2 | 8/2015 |
| EP | 2 680 668 B1 | 6/2016 |
| JP | 2009-087743 A | 4/2009 |
| JP | 4613585 B2 | 1/2011 |
| JP | 5319848 B2 | 10/2013 |
| JP | 5649714 B2 | 1/2015 |
| JP | 5943279 B2 | 7/2016 |
| JP | 5979386 B2 | 8/2016 |
| KR | 10-1999-0058482 A | 7/1999 |
| KR | 10-2017-0029800 A | 3/2017 |
| KR | 10-1846359 B1 | 4/2018 |

OTHER PUBLICATIONS

Extended European Search Report dated Oct. 4, 2021, in European Patent Application No. 19873159.8.
International Search Report dated Jan. 17, 2020, in corresponding International Patent Application No. PCT/KR2019/013177.
Written Opinion of the International Searching Authority dated Jan. 17, 2020, in corresponding International Patent Application No. PCT/KR2019/013177.
Office Action dated Oct. 13, 2022, issued in Chinese Application No. 201980068451.X.

\* cited by examiner

FIG. 5
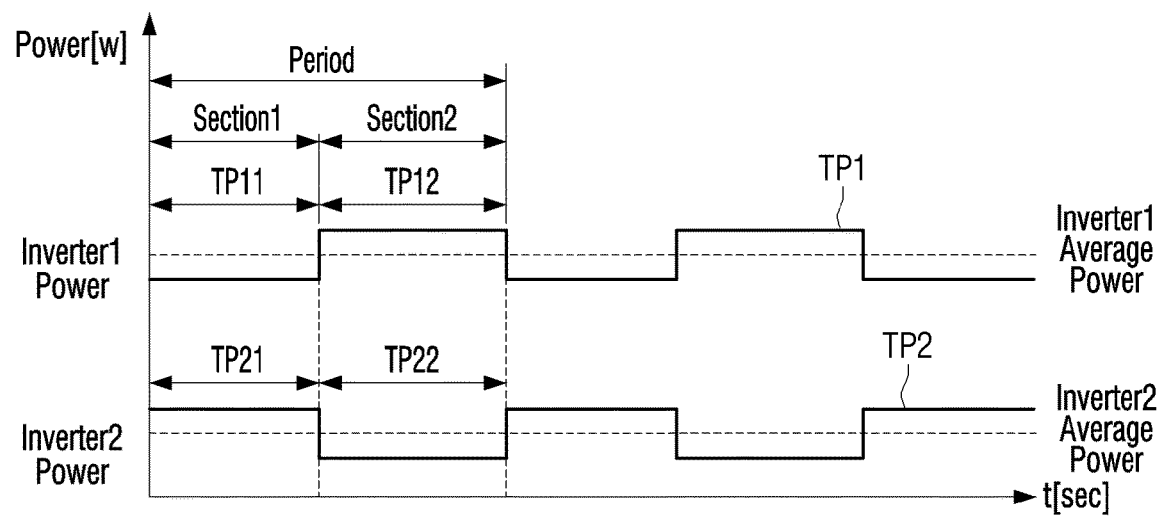
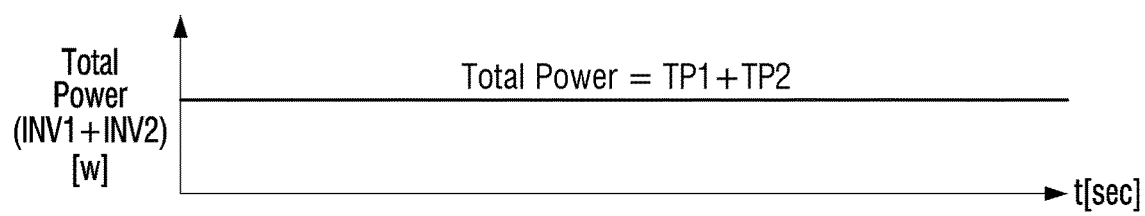

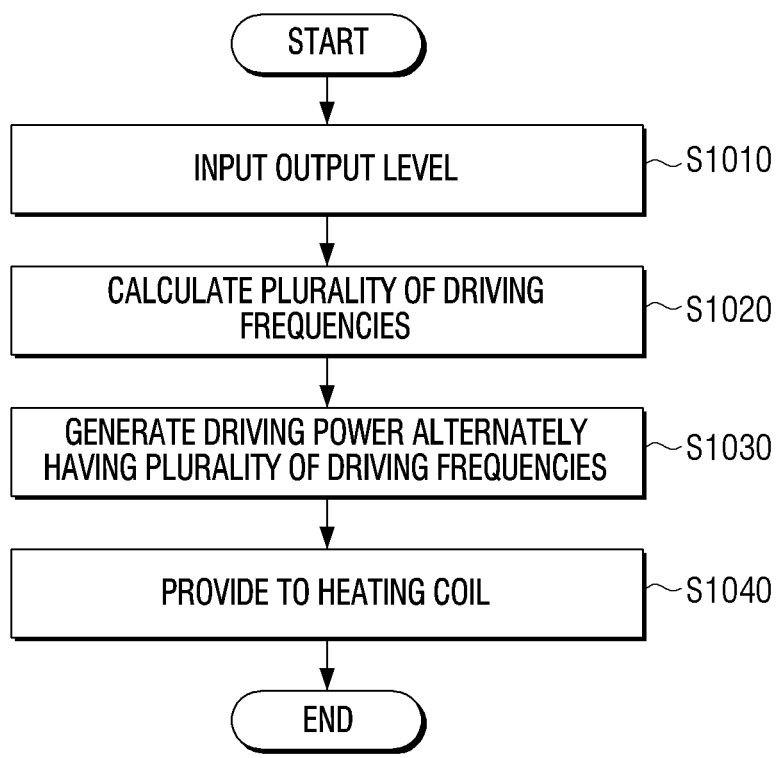

COOKING APPARATUS AND CONTROL METHOD THEREFOR

CROSS-REFERENCE TO RELATED APPLICATIONS

This application is a U.S. National Stage Application which claims the benefit under 35 U.S.C. § 371 of International Patent Application No. PCT/KR2019/013177 filed on Oct. 8, 2019, which claims foreign priority benefit under 35 U.S.C. § 119 of Korean Patent Application 10-2018-0124190 filed on Oct. 18, 2018, in the Korean Intellectual Property Office, the contents of both of which are incorporated herein by reference.

TECHNICAL FIELD

The disclosure relates to a cooking apparatus and a control method therefor, and more particularly to a cooking apparatus for providing a driving power alternately having a plurality of driving frequencies to a heating coil and a control method therefor.

BACKGROUND ART

The disclosure relates to a cooking apparatus and a control method therefor, and more particularly to a cooking apparatus for providing a driving power alternately having a plurality of driving frequencies to a heating coil and a control method therefor.

DISCLOSURE

Technical Problem

An object of the disclosure is to provide a cooking apparatus for providing a driving power alternately having a plurality of driving frequencies to a heating coil and a control method therefor.

Technical Solution

According to an aspect of the disclosure, there is provided a method for controlling a cooking apparatus, the method including receiving an output level regarding a heating coil, determining a plurality of driving frequencies regarding a driving power based on the output level, generating a driving power alternately having the plurality of determined driving frequencies, and providing the generated driving power to the heating coil.

According to another aspect of the disclosure, there is provided a cooking apparatus including a heating coil configured to generate a magnetic field for heating a cooking container, an inverter configured to provide a driving power to the heating coil, an input device configured to receive an output level regarding the heating coil, and a processor configured to determine a plurality of driving frequencies regarding the driving power based on the output level, generate a driving power alternately having the plurality of determined driving frequencies, and control the inverter to provide the generated driving power to the heating coil.

DESCRIPTION OF DRAWINGS

FIGS. 4 and 5 are diagrams illustrating an example of a driving power alternately having a plurality of driving frequencies;

FIG. 10 is a flowchart for illustrating a method for controlling a cooking apparatus according to an embodiment.

DETAILED DESCRIPTION OF EXEMPLARY EMBODIMENTS

Figure 1:
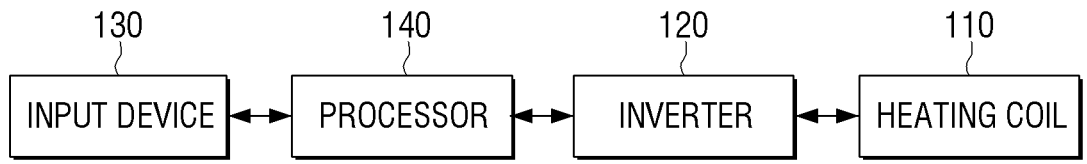
FIG. 1 is a block diagram illustrating a simple configuration of a cooking apparatus according to an embodiment.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

In the specification, a "cooking apparatus" may refer to an apparatus for heating, reheating, or cooling foods by using a heat supply power such as gas, power, or steam. Examples of such a cooking apparatus may include a gas stove, a microwave, an oven, a toaster, a coffee machine, a grill, or an induction heating cooking apparatus.

Hereinafter, with reference to the accompanying drawings, embodiments of the disclosure will be described in detail for those skilled in the art to easily practice the embodiments. But, the disclosure may be implemented in various different forms and is not limited to the embodiments described herein. In addition, in the drawings, the parts not relating to the description are omitted for clearly describing the disclosure.

Hereinafter, the disclosure will be described in more detail with reference to the drawings.

FIG. 1 is a block diagram illustrating a simple configuration of a cooking apparatus according to an embodiment.

Referring to FIG. 1, a cooking apparatus 100 may include a heating coil 110, an inverter 120, an input device 130, and a processor 140.

The heating coil 110 may perform a heating operation based on a driving power provided from the inverter 120. Such a cooking coil may be a heating element or an induction heating coil. For example, if the heating coil is a heating element, the heating coil may directly radiate heat based on the driving power, and if the heating coil is an induction heating coil, the heating coil may heat a cooking container on a burner using an induction current.

Herein, in a case of the cooking apparatus using the induction heating coil, if an alternating current is supplied to the induction heating coil, a magnetic field passing through the inner side of the induction heating coil is induced. The induced magnetic field may pass a bottom surface of the cooking container, an eddy current which is a rotating current is generated on the bottom surface, and the bottom surface of the cooking container may be heated by the generated eddy current.

In addition, an intensity of the magnetic field generated in the induction heating coil may be changed according to a frequency of the alternating current supplied to the induction heating coil. Specifically, as the frequency of the alternating current supplied to the induction heating coil increases, the intensity of the magnetic field decreases, and as the frequency of the alternating current supplied to the induction heating coil decreases, the intensity of the magnetic field increases.

Accordingly, the intensity of the magnetic field of the induction heating coil may be adjusted by adjusting a driving frequency of the driving power supplied to the induction heating coil, thereby adjusting power consumption of the induction heating coil. Hereinafter, for convenience of the description, the heating coil 110 may be assumed as the induction heating coil.

The inverter 120 may provide the driving power to the heating coil 110. Specifically, the inverter 120 may generate a power input from the outside as a driving power corresponding to an output level so that the driving power corresponding to the output level input from a user is provided to the heating coil, and provide the generated power to each heating coil.

More specifically, since the intensity of the magnetic field which is able to be generated by the heating coil is changed according to the driving frequency of the driving power as described above, the inverter 120 may provide the driving power corresponding to the output level of the heating coil by adjusting the driving frequency. Meanwhile, the specific configuration and operation of the inverter 120 will be described with reference to FIG. 3.

The input device 130 may receive a user command regarding the heating coil from the user. The user command herein may refer to a command for the heating coil to be controlled to perform an operation of turning on/off or to receive selection of an output level so that the heating coil is heated to a degree of the corresponding heating. For the output level, a corresponding value (e.g., 1, 2, 3, and 4) may be directly received or a relative change value (e.g., +1/−1) may be received.

The input device 130 may be implemented as a plurality of physical buttons or switches and may also be implemented as a touch screen for also performing a display function of displaying an operation state and the like.

The processor 140 may control each configuration of the cooking apparatus 100. Specifically, if the user command for the heating coil is received via the input device 130, the processor 140 may control the inverter so that the heating coil performs the operation corresponding to the received user command.

For example, if the user command for requesting 2-step output with respect to the heating coil 110 is received, the processor 140 may control the inverter 120 so that the inverter 120 generates the driving power corresponding to the 2-step output and provides the driving power to the heating coil 110.

For this, the processor 140 may calculate the driving frequency regarding the driving power corresponding to the input output level. For example, if an a level at which a power of 1,500 W is necessary is input, the processor 140 may determine 25 KHz as the driving frequency for supplying the power of 1,500 W.

In addition, the processor 140 may calculate a plurality of driving frequencies regarding the driving power based on the input output level. Specifically, the processor 140 may calculate the plurality of driving frequencies different from each other to provide a target power corresponding to the input output level.

For example, if the a level at which the power of 1,500 W is necessary is input and the driving frequency for supplying the power of 1,500 W is 25 KHz when providing the driving power as one driving frequency, the processor 140 may calculate the plurality of driving frequencies, 23 KHz and 27 KHz having an average value of 25 KHz, as the driving frequencies.

Meanwhile, the number of the plurality of driving frequencies may be 3 or more, other than 2 as described above, and the method for calculating the plurality of driving frequencies is not limited to the example described above.

The processor 140 may generate the driving power having the calculated driving frequencies and control the inverter 120 to provide the generated driving power to the heating coil 110. Specifically, if one driving frequency corresponding to the input output level is calculated, the processor 140 may control the inverter 120 to generate the driving power having the calculated one driving frequency.

Alternatively, if the plurality of driving frequencies corresponding to the input output level are calculated, the processor 140 may control the inverter 120 to generate the driving power alternately having the plurality of driving frequencies.

For example, if the processor 140 calculates 23 kHz and 27 KHz as the plurality of driving frequencies, the processor 140 may control the inverter 120 to generate the driving power having a repeated change of the driving frequencies with a frequency of 23 KHz during a predetermined first period and a frequency of 27 KHz during a predetermined second period.

The processor 140 may control the inverter 120 to provide the generated driving power to the heating coil 110.

In addition, hereinabove, the simple configuration configuring the cooking apparatus has been illustrated and described, and various configurations may be added in the implementation. This will be described below with reference to FIG. 2.

Figure 2:
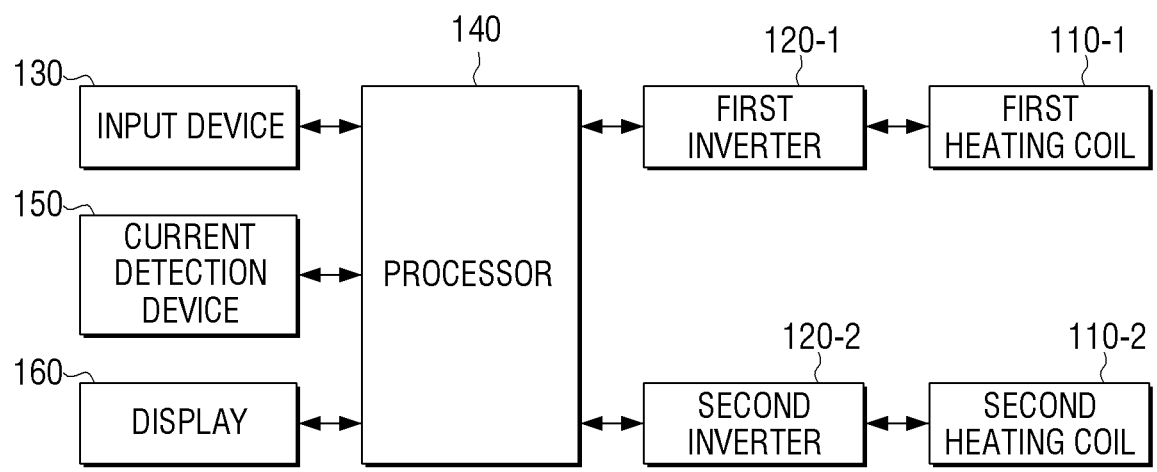
FIG. 2 is a block diagram illustrating a specific configuration of a cooking apparatus according to an embodiment.

FIG. 2 is a block diagram illustrating a specific configuration of a cooking apparatus according to an embodiment.

Referring to FIG. 2, the cooking apparatus 100 may include a plurality of heating coils 110-1 and 110-2, a plurality of inverters 120-1 and 120-2, the input device 130, the processor 140, a current detection device 150, and a display 160.

The plurality of heating coils 110-1 and 110-2 may include the first heating coil 110-1 and the second heating coil 110-2. Each of the plurality of heating coils 110-1 and 110-2 may be an induction heating coil for generating a magnetic field for heating a cooking container.

The plurality of inverters 120-1 and 120-2 may include the first inverter 120-1 and the second inverter 120-2. The first inverter 120-1 may provide the driving power to the first heating coil 110-1 and the second inverter 120-2 may provide the driving power to the second heating coil 110-2.

The input device 130 may receive a user command for each of the plurality of heating coils 110-1 and 110-2.

The processor 140 may calculate a common driving frequency regarding the driving power of each of the plurality of heating coils 110-1 and 110-2 based on the output level of each of the plurality of heating coils 110-1 and 110-2.

Specifically, the processor 140 may determine the common driving frequency based on the target power of the heating coil having a high output level among the plurality of heating coils 110-1 and 110-2 and control the inverter corresponding to the heating coil having a high output level to provide the driving power having the common driving frequency. The processor 140 may control the inverter corresponding to the heating coil with a low output level to intermittently provide the driving power having the common driving frequency.

However, in the above method, if an instantaneous output exceeds an acceptable range at the time point when the plurality of inverters 120-1 and 120-2 provide the driving power at the same time, the target power may not be provided to each of the plurality of heating coils 110-1 and 110-2.

In order to solve such a problem, the disclosure describes a method for generating the driving power having the plurality of driving frequencies, not generating the driving power having one driving frequency.

The processor 140 may calculate the plurality of driving frequencies regarding the driving power of each of the plurality of heating coils 110-1 and 110-2 based on the output level of each of the plurality of heating coils 110-1 and 110-2. Specifically, the processor 140 may calculate the plurality of driving frequencies different from each other regarding the driving power of each of the plurality of heating coils 110-1 and 110-2 to provide the target power corresponding to the output level of each of the plurality of heating coils 110-1 and 110-2.

For example, if the target power corresponding to the output level of the first heating coil 110-1 is 1,500 W and the driving frequency for supplying the power of 1,500 W is 25 KHz, the processor 140 may determine 23 KHz and 27 KHz having an average of 25 KHz as the plurality of driving frequencies of the first heating coil 110-1. In addition, if the target power corresponding to the output level of the second heating coil 110-2 is 1,200 W and the driving frequency for supplying the power of 1,200 W is 22 KHz, the processor 140 may determine 23 KHz and 21 KHz having an average value of 22 K-Hz as the plurality of driving frequencies of the second heating coil 110-2.

Meanwhile, the number of plurality of driving frequencies may be 3 or more, other than 2 as described above, and the method for calculating the plurality of driving frequencies is not limited to the example described above.

Meanwhile, the specific operation of calculating the plurality of driving frequencies based on the output level of each of the plurality of heating coils 110-1 and 110-2 will be described later with reference to FIGS. 4 and 5.

The processor 140 may control the plurality of inverters 120-1 and 120-2 to generate the plurality of driving powers alternately having the plurality of driving frequencies of each of the plurality of heating coils 110-1 and 110-2.

For example, if the plurality of driving frequencies of the first heating coil 110-1 are 23 KHz and 27 KHz and the plurality of driving frequencies of the second heating coil 110-2 are 23 KHz and 21 KHz, the processor 140 may control the first inverter and the second inverter so that the first inverter 120-1 generates a first driving power alternately having frequencies of 23 KHz and 27 KHz and the second inverter generates a second driving power alternately having frequencies of 23 KHz and 21 KHz.

When generating each of the plurality of driving powers, the processor 140 may control the plurality of inverters 120-1 and 120-2 so that the time points when the frequency is changed coincide with each other. For example, the processor 140 may control the first inverter 120-1 and the second inverter 120-2 to generate a driving power having a first driving frequency during the predetermined first period and generate a driving power having a second driving frequency during the predetermined second period.

The processor 140 may control the plurality of inverters 120-1 and 120-2 to provide the generated plurality of driving powers to each of the plurality of heating coils 110-1 and 110-2.

As descried above, the processor 140 may control each of the plurality of inverters 120-1 and 120-2 to provide the driving power having the plurality of driving frequencies to provide the target power corresponding to the output level of each of the plurality of heating coils 110-1 and 110-2.

The above method is different from the method in which an inverter intermittently provides a power by repeating on and off operations of the inverter which is the method of the related art. Specifically, in the disclosure, each driving power provided to each of the plurality of heating coils 110-1 and 110-2 may change the frequency according to the time point, but continuously provide the power to distribute the power without the on and off operations, thereby preventing a phenomenon of increase in instantaneous output at a specific time point.

The current detection device 150 may be connected to each of the plurality of heating coils 110-1 and 110-2 to detect a current flowing to the plurality of heating coils 110-1 and 110-2. The current detection device 150 may provide information of the detected current to the processor 140.

The processor 140 may calculate power consumption of each of the plurality of heating coils 110-1 and 110-2 based on the information of the current received from the current detection device 150. The processor 140 may compare the power consumption and a target power of each of the plurality of heating coils 110-1 and 110-2. If there is a difference, the processor 140 may control the inverter 120 to change the frequency of the driving power or change the phase so that the power consumption coincides with the target power.

Meanwhile, the specific operation of the processor 140 to control the inverter 120 so that the power consumption coincides with the target power will be described later with reference to FIGS. 6 to 8.

The display 160 may display various information provided from the cooking apparatus 100. Specifically, the display 160 may display an operation state of the cooking apparatus 100 or display a user interface window for a function selected by a user or option selection.

Meanwhile, in illustrating and describing FIG. 2, it is illustrated and described that two heating coils and two inverters are included, but in the implementation, three or more heating coils and three or more inverters may be included.

In the related art, since the plurality of driving powers provided to the plurality of heating coils are generated based on one driving frequency, the instantaneous output of the driving power at a specific time point exceeded an acceptable range, which makes it difficult to achieve the target output.

However, as described above, in the disclosure, by controlling the plurality of driving powers to have a plurality of driving frequencies, it is possible to exhibit an effect of preventing the instantaneous output of the driving power at a specific time point from exceeding an acceptable range.

Figure 3:
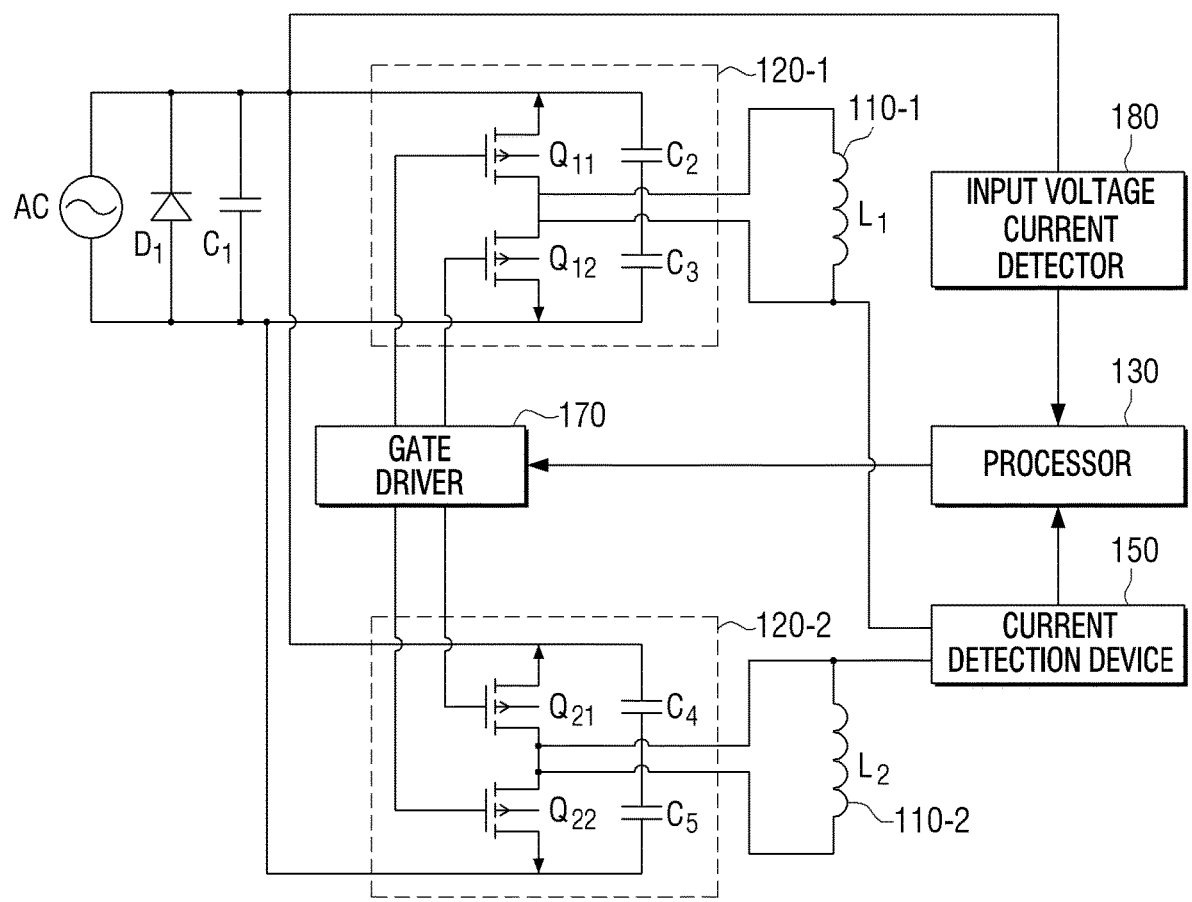
FIG. 3 is a circuit diagram of a cooking apparatus according to an embodiment.

FIG. 3 is a flowchart of a cooking apparatus according to an embodiment.

Referring to FIG. 3, the cooking apparatus 100 may include a power supply AC, a rectifier circuit D1, a smoothing circuit C1, the plurality of inverters 120-1 and 120-2, the plurality of heating coils 110-1 and 110-2, the processor 140, the current detection device 150, a gate driver 170, and an input voltage current detector 180.

The power supply AC may be connected to an external commercial power supply to receive power. The power supply AC may include a power switch, and if a power-on signal is received via the input device 130, the power supply AC may turn on the power switch to be connected to the external commercial power supply.

The rectifier D1 may receive power from the power supply AC to perform rectification and may transfer the rectified power to the smoothing circuit C1. The rectifier circuit D1 may include at least one diode and may also include a bridge diode.

The smoothing circuit C1 may remove ripple of the power rectified by the rectifier circuit D1 and transfer the power to the plurality of inverters 120-1 and 120-2. Specifically, the smoothing circuit C1 may convert the applied power into a direct current by removing a pulsating current and may transfer the power of the converted current to the plurality of inverters 120-1 and 120-2.

The plurality of inverters 120-1 and 120-2 may be connected to the plurality of heating coils 110-1 and 110-2, respectively, and may generate the driving power to provide it to each of the plurality of heating coils 110-1 and 110-2.

The first inverter 120-1 may include a plurality of switching elements Q11 and Q12 which are connected between both ends of the smoothing circuit C1 and receive an operation signal from the gate driver 170, may include a plurality of capacitors C2 and C3 connected to both ends of the smoothing circuit C1, and may be connected to the first heating coil 110-1.

The second inverter 120-2 may include a plurality of switching elements Q21 and Q22 which are connected between both ends of the smoothing circuit C1 and receive an operation signal from the gate driver 170, may include a plurality of capacitors C4 and C5 connected to both ends of the smoothing circuit C1, and may be connected to the second heating coil 110-2.

The plurality of inverters 120-1 and 120-2 may repeat turn-on and turn-off operations of the plurality of switching elements Q11, Q12, Q21, and Q22 according to the operation signal input from the gate driver 170, generate a current with a direction changing accordingly and supply the current to each of the plurality of heating coils 110-1 and 110-2.

For example, if the first switching element Q11 of the first inverter 120-1 is turned on and the second switching element Q12 is turned off, a driving current in a first direction may be supplied to the first heating coil 110-1, and if the first switching element Q11 is turned off and the second switching element Q12 is turned on, a driving current in a second direction may be supplied to the first heating coil 110-1.

A cycle of the turn-on and turn-off operations of the plurality of switching elements Q11, Q12, Q21, and Q22 of the plurality of inverters 120-1 and 120-2 may be determined according to the driving frequency of the driving power. The power consumption of the heating coil changes according to the cycle of the turn-on and turn-off operations of the plurality of switching elements Q11, Q12, Q21, and Q22, and accordingly, the processor 140 may change the power consumption of each heating coil by adjusting the driving frequency of the driving power.

The processor 140 may change the cycle of the turn-on and turn-off operations of the plurality of switching elements Q11, Q12, Q21, and Q22 according to the plurality of driving frequencies.

Specifically, the processor 140 may provide a control instruction for instructing to generate the driving power having a first driving frequency during a predetermined first period and a second driving frequency during a predetermined second period to the gate driver 170. The operation signal may be provided to the plurality of switching elements Q11, Q12, Q21, and Q22 so that the gate driver 170 performs the operation corresponding thereto.

In addition, the processor 140 may perform pulse width modulation (PWM) regarding the turn-on and turn-off operations of the plurality of switching elements Q11, Q12, Q21, and Q22.

The plurality of heating coils 110-1 and 110-2 may generate a magnetic field by using the driving power provided from the plurality of inverters 120-1 and 120-2. The generated magnetic field may pass through a bottom surface of a cooking container, an eddy current which is a rotating current may be generated on the bottom surface, and the bottom surface of the cooking container may be heated by the generated eddy current.

The current detection device 150 may be connected to each of the plurality of heating coils 110-1 and 110-2, detect a current flowing to each of the plurality of heating coils 110-1 and 110-2, and provide information of the detected current to the processor 140.

For example, the current detection device 150 may include a current transformer for reducing a magnitude of a current in proportion to a magnitude of a current supplied to the first heating coil 110-1 and an ampere meter for detecting the magnitude of the reduced current.

In another example, the current detection device 150 may include a shunt resistance connected to the first heating coil 110-1 and a measurement device (not illustrated) for measuring a voltage drop occurring in the shunt resistance.

The gate driver 170 ma generate an operation signal regarding the turn-on and turn-off operations of the plurality of switching elements Q11, Q12, Q21, and Q22 according to the control instruction of the processor 140. The gate driver 170 may be implemented to be included in the processor 140 and may be implemented as a separate device from the processor 140.

The input voltage current detector 180 may be connected to the power supply AC to detect a current or a voltage of the input power provided to the plurality of inverters 120-1 and 120-2. The input voltage current detector 180 may provide a detection result to the processor 140.

The processor 140 may calculate a phase of a current flowing to each heating coil based on the detection result of the input voltage current detector 180 and the current detection device 150. The processor may change the phase of the driving power provided to each of the heating coils 110-1 and 110-2 based on the calculated phase information. This will be described later in detail with reference to FIGS. 8 and 9.

Figure 4:
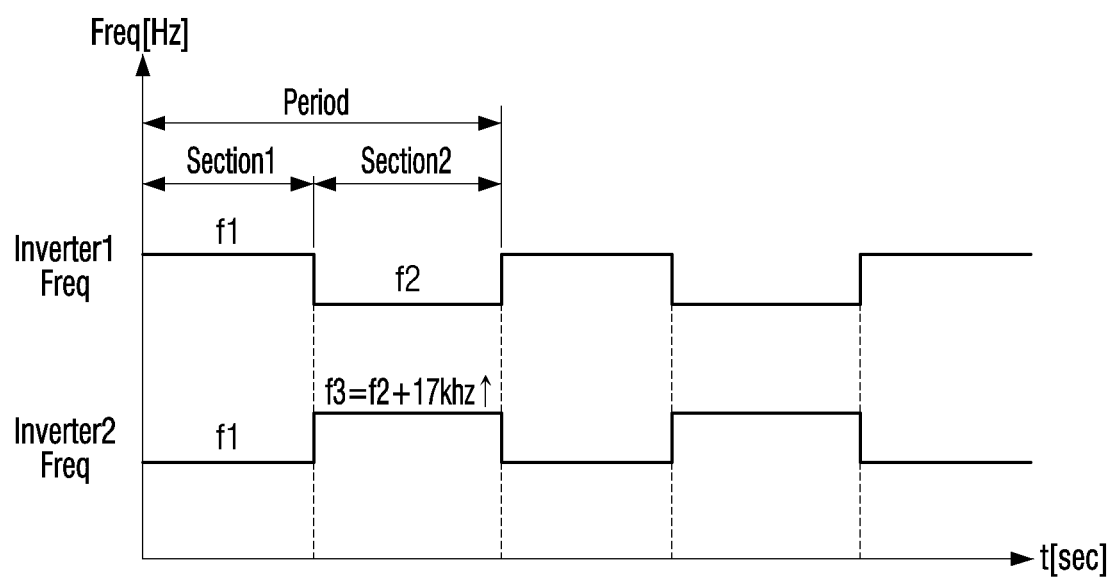

FIGS. 4 and 5 are diagrams illustrating an example of a driving power alternately having a plurality of driving frequencies.

FIG. 4 is a diagram illustrating an example in which the driving frequencies of the plurality of driving powers are alternating over time. FIG. 5 is a diagram illustrating an example in which the power consumptions provided by the plurality of driving power are alternating over time.

Referring to FIG. 4, it may be confirmed that the driving frequency of the driving power provided to the first inverter 120-1 has a first frequency f1 during a first section 1 and has a second frequency f2 during a second section 2. In addition, it may be confirmed that the driving frequency of the driving power provided to the second inverter 120-2 has the first frequency f1 during the first section 1 and has a third frequency f3 during the second section 2.

In other words, the driving power of each inverter may have the first frequency f1 which is the common driving frequency during the first section 1 and may have the second frequency f2 and the third frequency f3 which are individual driving frequencies during the second section 2.

Hereinafter, a method for determining the common driving frequency f1 and the driving frequencies f2 and f3 for each heating coil will be described.

First, the processor 140 may calculate a target power of each of the plurality of heating coils 110-1 and 110-2 based on an output level input to the plurality of heating coils 110-1 and 110-2.

The processor 140 may determine the common driving frequency f1 of the driving power generated by the plurality of inverters 120-1 and 120-2 based on a total of the target powers of the plurality of heating coils 110-1 and 110-2.

Specifically, based on an average of the total of the target powers of the plurality of heating coils 110-1 and 110-2, the processor 140 may determine the common driving frequency f1 corresponding thereto. The cooking apparatus 100 may pre-store information of the common driving frequency f1 corresponding to the target power in a memory (not illustrated) in order to determine the common driving frequency f1 corresponding to the average of the total of the target powers.

For example, if the target power of the first heating coil 110-1 is 1,800 W and the target power of the second heating coil 110-2 is 1,200 W, the common driving frequency f1 of the driving power may be determined based on 1,500 W which is an average of 3,000 W which is the total of the target powers. Meanwhile, the method for determining the common driving frequency is not limited to the above example.

The processor 140 may calculate the individual driving frequencies of the plurality of heating coils 110-1 and 110-2 corresponding to the output level and the common driving frequency of each of the plurality of heating coils 110-1 and 110-2.

Specifically, the processor 140 may calculate the individual driving frequency at which an average of a power consumption of a specific inverter generated in the first section 1, in which the common driving frequency is applied, and a power consumption of a specific inverter generated in the second section 2, in which the individual driving frequency is applied, is the same as the target power of the corresponding heating coil.

For example, referring to FIG. 5, the power consumption of the first heating coil in the first section 1 may be assumed as TP11, the power consumption of the second heating coil in the first section 1 may be assumed as TP21, the power consumption of the first heating coil in the second section 2 may be assumed as TP12, and the power consumption of the second heating coil in the second section 2 may be assumed as TP22.

The processor 140 may calculate the individual driving frequencies f2 and f so that the average of TP11 and TP12 is the same as the target power of the first heating coil 110-1 and the average of TP21 and TP22 is the same as the target power of the second heating coil 110-2.

In addition, the processor 140 may calculate the individual driving frequencies so that the total of the power consumptions of the plurality of inverters 120-1 and 120-2 generated in the first section 1, in which the common frequency is applied, is the same as the total of the power consumptions of the plurality of inverters 120-1 and 120-2 generated in the second section 2, in which the individual driving frequencies are applied.

For example, referring to FIG. 5, the processor 140 may calculate the individual driving frequencies f2 and f3 to satisfy TP11+TP21=TP12+TP22.

As described above, when the common driving frequency f1 and the driving frequencies f2 and f3 for each heating coil are determined, as illustrated in FIG. 5, the total of the power consumptions (TP=TP1+TP2) provided by each of the plurality of inverters 120-1 and 120-2 may have a constant value over time. At the same time, the power consumption same as the target power of each of the plurality of heating coils 110-1 and 110-2 may be provided. Accordingly, it is possible to provide suitable power to each coil while preventing the instantaneous output of the cooking apparatus 100 at a specific time point from exceeding an acceptable range.

In addition, the processor 140 may calculate the individual driving frequencies so that a difference between the individual driving frequencies f2 and 13 has a predetermined value or more. Specifically, the processor 140 may calculate the individual driving frequencies so that the individual driving frequency f3 of the heating coil having a lower target power is higher than the individual driving frequency f2 of the heating coil having a higher target power by the predetermined value or more.

The predetermined value herein may correspond to an audible frequency range. When the plurality of inverters generate the driving powers operating at the individual driving frequencies, an interference sound may be generated due to a difference between the driving frequencies of each driving power. If the difference between the individual driving frequencies f2 and f3 corresponds to the audible frequency range, the human may hear the interference sound.

Accordingly, the predetermined value may correspond to 17 Khz in the audible frequency range, and therefore, the noise may be prevented without using the same driving frequency.

Meanwhile, the individual driving frequency f3 of the heating coil having a lower target power may be determined as 0, if the target power is satisfied only with the power consumption generated in the first section 1 operating at the common driving frequency f1.

The processor 140 may control each of the plurality of inverters 120-1 and 120-2 to generate the driving power having the common driving frequency in the first section 1 and the individual driving frequency in the second section 2. The processor 140 may control the plurality of inverters 120-1 and 120-2 to provide the generated driving power to the plurality of corresponding heating coils 110-1 and 110-2.

Meanwhile, in illustrating and describing FIG. 5, it is illustrated and described that two heating coils and two inverters are included, but in the implementation, three or more heating coils and three or more inverters may be included.

Figure 6:
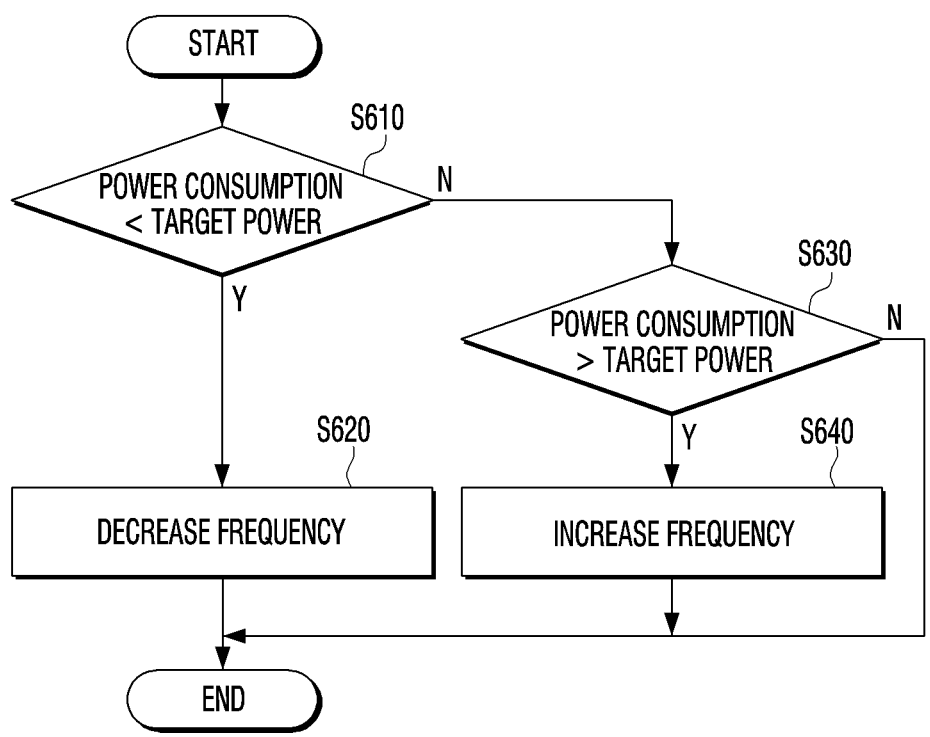
FIG. 6 is a diagram illustrating an operation of changing a driving frequency of a driving power.

FIG. 6 is a diagram illustrating an operation of changing a driving frequency of a driving power.

The processor 140, as described above, may calculate the common driving frequency and the individual driving frequencies based on the output level of each of the plurality of heating coils 110-1 and 110-2 and control the plurality of inverters 120-1 and 120-2 to generate the driving power alternately having the calculated plurality of driving frequencies.

However, since the plurality of heating coils 110-1 and 110-2 are adjacent to each other, the power actually provided to each of the plurality of heating coils 110-1 and 110-2 may not satisfy the target power due to interference of magnetic fields or other reasons. Accordingly, the processor 140 may calculate the power consumption of each of the plurality of heating coils 110-1 and 110-2 using current information detected through the current detection device 150 and give a feedback to have a value same as the target power.

Hereinafter, the operation in which the processor 140 gives a feedback by changing the individual driving frequency of each of the plurality of driving powers will be described. In addition, the operation of giving a feedback by changing the individual driving frequency may be performed regardless of the size of the target output of each of the plurality of heating coils 110-1 and 110-2 and may be applied to all of the plurality of inverters 120-1 and 120-2 by the same method, and therefore the description will be made using the first heating coil 110-1 as an example.

First, the processor 140 may confirm whether the power consumption of the first heating coil 110-1 detected through the current detection device 150 is lower than the target power of the first heating coil 110-1 (S610).

If the power consumption is lower than the target power (S610-Y), the processor 140 may control the first inverter 120-1 to provide increased power consumption by reducing the individual driving frequency f2. On the other hand, if the power consumption is not lower than the target power (S610-N), the processor 140 may confirm whether the power consumption is higher than the target power (S630).

If the power consumption is higher than the target power (S630-Y), the processor 140 may control the first inverter 120-1 to provide reduced power consumption by increasing the individual driving frequency f2 (S640). On the other hand, if the power consumption is not higher than the target power (S630-N), in other words, if the power consumption is the same as the target power, the frequency change may not be performed.

Meanwhile, if a difference between the individual driving frequency of the driving power provided to the first heating coil 110-1 and the individual driving frequency of the driving power provided to the second heating coil 110-2 does not have the predetermined value or more due to the feedback operation of the processor 140, a noise due to the interference sound may be generated. In this case, the processor 140 may change each individual driving frequency to the same frequency.

Figure 7:
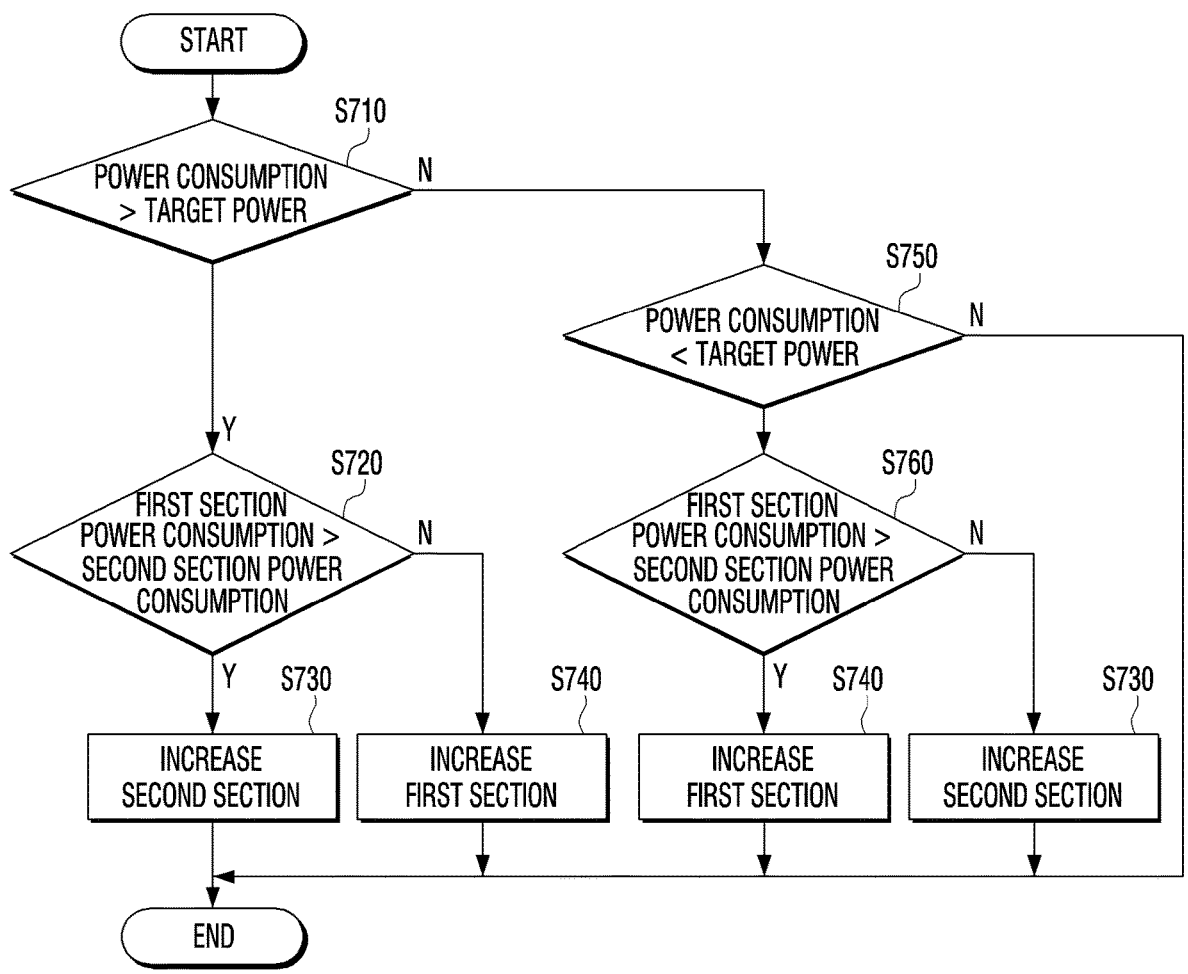
FIG. 7 is a diagram illustrating an operation of adjusting a change time of a driving frequency of a driving power.

FIG. 7 is a diagram illustrating an operation of adjusting a change time of a driving frequency of a driving power.

The processor 140 may perform a feedback operation by adjusting a change time of the driving frequency of the driving power, in addition to the feedback operation through the change of the individual driving frequency described above.

Meanwhile, the operation for giving a feedback by adjusting the change time of the driving frequency of the driving power may be performed regardless of the size of the target output of each of the plurality of heating coils 110-1 and 110-2 and may be applied to all of the plurality of inverters 120-1 and 120-2 by the same method, and therefore the description will be made using the first heating coil 110-1 as an example.

First, the processor 140 may confirm whether the power consumption of the first heating coil 110-1 detected through the current detection device 150 is higher than the target power of the first heating coil 110-1 (S710).

If the power consumption of the first heating coil 110-1 is higher than the target power of the first heating coil 110-1 (S710-Y), the processor 140 may confirm whether the power consumption in the first section 1 is higher than the power consumption in the second section 2 (S720).

If the power consumption in the first section 1 is higher than the power consumption in the second section 2 (S720-Y), the processor 140 may reduce the first section 1 and increase the second section 2, in order to reduce the power consumption of the first heating coil 110-1.

On the other hand, if the power consumption in the first section 1 is lower than the power consumption in the second section 2 (S720-N), the processor 140 may increase the first section 1 and reduce the second section 2, in order to reduce the power consumption of the first heating coil 110-1.

Meanwhile, if the power consumption of the first heating coil 110-1 is not higher than the target power of the first heating coil 110-1 (S710-N), the processor 140 may confirm whether the power consumption of the first heating coil 110-1 is lower than the target power of the first heating coil 110-1 (S750).

If the power consumption of the first heating coil 110-1 is lower than the target power of the first heating coil 110-1 (S750-Y), the processor 140 may confirm whether the power consumption in the first section 1 has a higher value than the consumption power in the second section 2 (S760).

If the power consumption in the first section 1 is higher than the power consumption in the second section 2 (S760-Y), the processor 140 may increase the first section 1 and reduce the second section 2, in order to increase the power consumption of the first heating coil 110-1 (S740).

On the other hand, if the power consumption in the first section 1 is lower than the power consumption in the second section 2 (S760-N), the processor 140 may reduce the first section 1 and increase the second section 2, in order to increase the power consumption of the first heating coil 110-1.

Meanwhile, if the power consumption of the first heating coil 110-1 is not lower than the target power of the first heating coil 110-1 (S750-N), in other words, if the power consumption of the first heating coil 110-1 is the same as the target power, the change of the first section 1 and the second section 2 may not be performed.

Meanwhile, in illustrating and describing FIG. 7, it is illustrated and described that the sections corresponding to each of the plurality of driving frequencies are two in total which are the first section and the second section, but in the implementation, a driving power having three or more driving frequencies may be generated, three or more sections may be provided accordingly, and a feedback may be given by adjusting the three or more sections described above.

Figure 8:
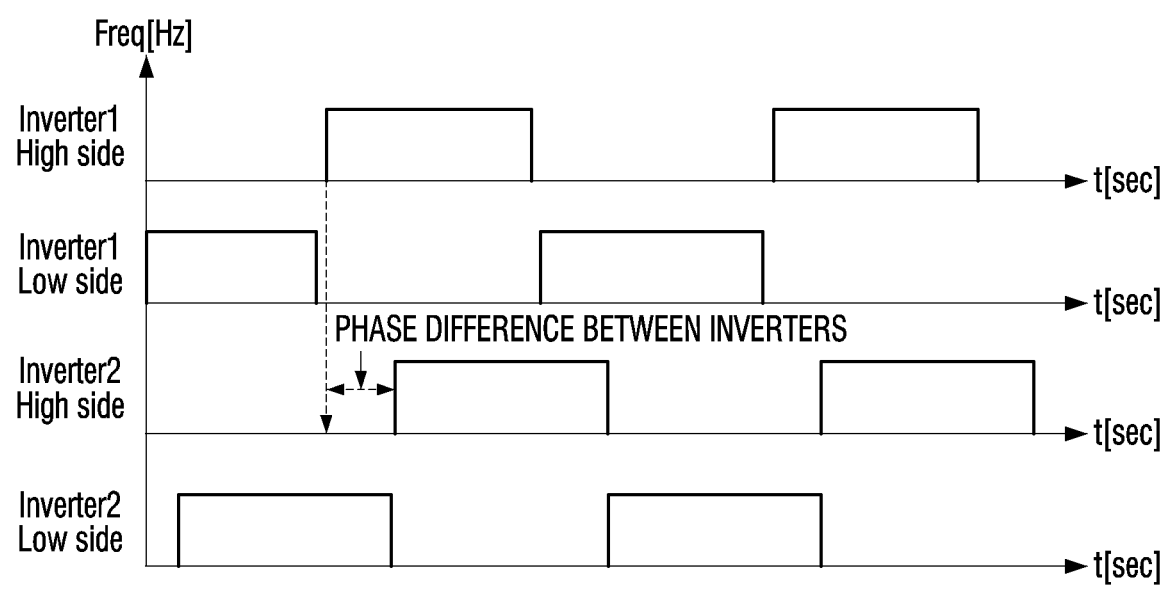
FIGS. 8 and 9 are diagrams illustrating an example of a plurality of driving powers having different phases.
Figure 9:
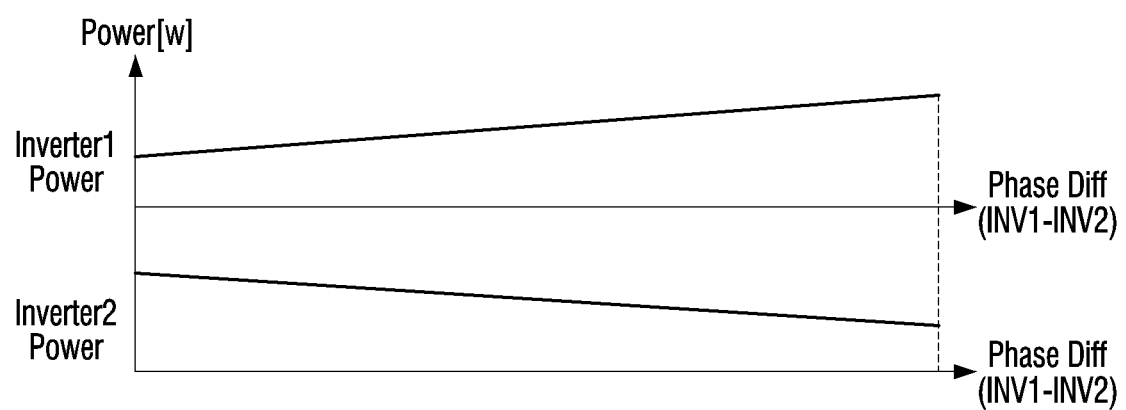

FIGS. 8 and 9 are diagrams illustrating an example of a plurality of driving powers having different phases.

FIG. 8 is a diagram illustrating an example of the turn-on and turn-off operations of the switching element of the plurality of inverters and FIG. 9 is a diagram illustrating an example of a change of a power according to a phase difference of the driving power of each of the plurality of inverters.

Referring to FIG. 8, regarding the first inverter, the turn-on and turn-off operations of the first switching element Q11 may be confirmed on a high side of the first inverter 120-1 and the turn-on and turn-off operations of the second switching element Q12 may be confirmed on a low side of the first inverter 120-1.

In addition, regarding the second inverter, the turn-on and turn-off operations of the first switching element Q21 may be confirmed on a high side of the second inverter 120-2 and the turn-on and turn-off operations of the second switching element Q22 may be confirmed on a low side of the second inverter 120-2.

In relating to the operation of the switching element, as described above, the switching element of each inverter may repeat the turn-on and turn-off operations and the switching elements in one inverter may be operated not to overlap the turn-on or turn-off operation.

Meanwhile, the time point when the high side of each inverter is turned on may be the same or different and a difference thereof may be expressed as a phase based on the time point when the high side is turned on.

In other words, referring to FIG. 8, it may be confirmed that there is a difference between the time point when the high side of the first inverter is turned on and the time point when the high side of the second inverter is turned on, and this may be expressed as a phase difference between the inverters.

Specifically, if the entire period including the first section 1 and the second section 2 of each inverter is assumed as 360 degrees and the time point of the turn-on of the high side of the first inverter is assumed as 0 degree, the time from the time point of the turn-on of the high side of the first inverter until the time point of the turn-on of the high side of the second inverter may be expressed as an angle.

For example, if the entire period is 10 seconds, and the time from the time point of the turn-on of the high side of the first inverter until the time point of the turn-on of the high side of the second inverter is 1 second, the phase of the second inverter may be expressed as 1/10*360=36.

Meanwhile, as described above, if the phases of the driving power of each of the plurality of inverters 120-1 and 120-2 are different, the power of each driving power may be changed. This is because, if the plurality of heating coils are positioned to be adjacent to each other and the driving power having the same frequency is input, the line of induction generated from one heating coil may affect a heating area of another coil as induced voltage.

Specifically, referring to FIG. 9, if the phase of the driving power generated by the first inverter 120-1 is ahead of the phase of the driving power generated by the second inverter 120-2, the power of the driving power generated by the first inverter 120-1 may increase. In contrast, the power of the driving power generated by the second inverter 120-2 may be reduced.

Meanwhile, the gradual increase in power when the phase of the driving power generated by the first inverter 120-1 is ahead is limited to a case where the phase is ahead from 0 degrees to 90 degrees. If it exceeds 90 degrees, the power of the driving power generated by the first inverter 120-1 may be reduced again. In addition, the feature described above may be applied to only the driving powers having the same frequencies.

Accordingly, the processor 140 may perform the feedback operation by changing the phase of each of the plurality of driving powers, in addition to the feedback operation through the change of the individual driving frequency and the adjustment of the change time of the driving frequency of the driving power using the above feature.

First, the processor 140 may confirm whether the power consumption of the first heating coil 110-1 is lower than the target power of the first heating coil 110-1.

If the power consumption is lower than the target power, the processor 140 may set so that the phase when the driving power of the first heating coil 110-1 is operated at the common frequency is ahead of the phase of the driving power provided to the second heating coil 110-2. On the other hand, if the power consumption is higher than the target power, the processor 140 may set so that the phase when the driving power of the first heating coil 110-1 is operated at the common frequency is behind the phase of the driving power provided to the second heating coil 110-2.

Meanwhile, in illustrating and describing FIGS. 8 and 9, the feedback method through the phase difference between two driving powers is illustrated and described, but in the implementation, a feedback method through the phase difference between three or more driving powers may be performed.

FIG. 10 is a flowchart for illustrating a method for controlling a cooking apparatus according to an embodiment.

Referring to FIG. 10, first, an output level of a heating coil is input (S1010). If a plurality of heating coils are provided, an output level of each of the plurality of heating coils may be input.

A plurality of driving frequencies of the driving power may be calculated based on the output level (S1020). Specifically, the plurality of driving frequencies different from each other may be calculated so as to provide a target power corresponding to the input output level.

If the plurality of heating coils are provided, the plurality of driving frequencies different from each other may be calculated so as to provide a target power corresponding to the input output level of each of the plurality of heating coils.

Specifically, a common driving frequency which is common for the plurality of heating coils may be calculated. For example, based on an average of a total of the target powers of the plurality of heating coils, the common driving frequency may be determined corresponding thereto.

An individual driving frequency corresponding to the output level of each of the plurality of heating coils and the determined common driving frequency may be calculated.

Specifically, the individual driving frequency at which an average of a power consumption of a specific inverter generated in a first section 1, in which the common driving frequency is applied, and a power consumption of a specific inverter generated in a second section 2, in which the individual driving frequency is applied, is the same as the target power of the corresponding heating coil may be calculated.

In addition, the individual driving frequencies may be calculated so that the total of the power consumptions of the plurality of inverters generated in the first section 1, in which the common frequency is applied, is the same as the sum of the power consumptions of the plurality of inverters generated in the second section 2, in which the individual driving frequency is applied.

Further, the individual driving frequencies may be calculated so that a difference between the individual driving frequencies has a predetermined value or more. The predetermined value herein may correspond to an audible frequency range.

A driving power alternately having the calculated plurality of driving frequencies may be generated (S1030). If the plurality of heating coils are provided, the plurality of driving powers alternately having the calculated plurality of driving frequencies of each of the plurality of heating coils may be generated.

Specifically, the plurality of inverters may be controlled to generate the driving power having the common driving frequency in the first section 1 and the individual driving frequencies in the second section 2.

The generated driving power may be provided to the heating coil (S1040). If the plurality of heating coils are provided, the generated plurality of driving powers may be provided to the plurality of heating coils, respectively.

Therefore, the method for controlling the cooking apparatus of the disclosure has an effect of preventing the instantaneous output of the driving power at a specific time point from exceeding an acceptable range, by controlling the plurality of driving powers to have the plurality of driving frequencies. The control method illustrated in FIG. 10 may be executed on an electronic device having the configuration of FIG. 1 or FIG. 2 and may also be executed on a cooking apparatus having other configurations.

In addition, the control method described above may be implemented as at least one execution program for executing the above control method and such an execution program may be stored in a non-transitory computer-readable medium.

The non-transitory computer-readable medium is not a medium storing data for a short period of time such as a register, a cache, or a memory, but may refer to a medium that semi-permanently stores data and is readable by a machine. Specifically, the various applications or programs described above may be stored and provided to the non-transitory computer-readable medium such as a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A method for controlling a cooking apparatus, the method comprising:
  receiving information indicating a plurality of output levels for a plurality of heating coils of the cooking apparatus, respectively;
  determining a common driving frequency that is common to each heating coil of the plurality of heating coils;
  determining, for each heating coil of the plurality of heating coils, at least one individual driving frequency different from the common driving frequency to generate a driving power for the heating coil corresponding to the output level for the heating coil and in which the common driving frequency and the at least one individual driving frequency are alternated;
  generating, for each heating coil of the plurality of heating coils, the driving power for the heating coil; and
  providing, to each heating coil of the plurality of heating coils, the generated driving power for the heating coil.

2. The method according to claim 1, wherein, for each heating coil of the plurality of heating coils, the determined at least one individual driving frequency for the heating coil is one individual driving frequency that, together with the common driving frequency, generates a target power for the heating coil corresponding to the output level for the heating coil.

3. The method according to claim 1, wherein the the common driving frequency and the at least one individual driving frequency for each heating coil of the plurality of heating coils are determined so that power consumption of the cooking apparatus at time points when the common driving frequency is applied and power consumption of the cooking apparatus at time points when the at least one individual driving frequency for each heating coil of the plurality of heating coils is applied are same as each other.

4. The method according to claim 1, wherein
  the plurality of heating coils includes a first heating coil and a second heating coil, and
  the determining, for each heating coil of the plurality of heating coils, at least one individual driving frequency includes:
    determining the at least one individual driving frequency for the first heating coil based on the output level for the first heating coil and the common driving frequency, and
    determining the at least one individual driving frequency for the second heating coil based on the output level for the second heating coil and the common driving frequency.

5. The method according to claim 4, wherein the determining the common driving frequency includes:
  determining the common driving frequency based on an average of a target power of the first heating coil and a target power of the second heating coil.

6. The method according to claim 5, wherein the determining, for each heating coil of the plurality of heating coils, at least one individual driving frequency includes:
  determining the at least one individual driving frequency for the first heating coil based on the target power of the first heating coil and the determined common driving frequency, and
  determining the at least one individual driving frequency for the second heating coil based on the target power of the second heating coil and the determined common driving frequency.

7. The method according to claim 4, wherein
  the at least one individual driving frequency for the first heating coil is one individual driving frequency,
  the at least one individual driving frequency for the second heating coil is one individual driving frequency, and
  a difference between the one individual driving frequency that is the at least one individual driving frequency for the first heating coil and the one individual driving frequency that is the at least one individual driving frequency for the second heating coil has a predetermined value or more.

8. The method according to claim 4, wherein the at least one individual driving frequency for the first heating coil is one individual driving frequency, the at least one individual driving frequency for the second heating coil is one individual driving frequency, the driving power for the first heating coil has the common driving frequency in a first time section and the one individual driving frequency that is the at least one individual driving frequency for the first heating coil in a second time section, and the driving power for the second heating coil has the common driving frequency in the first time section and the one individual driving frequency that is the at least one individual driving frequency for the second heating coil in the second time section.

9. A cooking apparatus comprising:

a plurality of heating coils configured to generate a magnetic field to heat a cooking container;

a plurality of inverters;

an input device configured to receive information indicating a plurality of output levels for the plurality of heating coils, respectively; and a processor configured to:

determine a common driving frequency that is common to each heating coil of the plurality of heating coils, determine, for each heating coil of the plurality of heating coils, at least one individual driving frequency different from the common driving frequency to generate a driving power for the heating coil corresponding to the output level for the heating coil and in which the common driving frequency and the at least one individual driving frequency are alternated, and control the plurality of inverters to generate, for each heating coil of the plurality of heating coils, the driving power for the heating coil, and to provide, to each heating coil of the plurality of heating coils, the generated driving power for the heating coil.

10. The cooking apparatus according to claim 9, wherein, for each heating coil of the plurality of heating coils, the determined at least one individual driving frequency for the heating coil is one individual driving frequency that, together with the common driving frequency, generates a target power for the heating coil corresponding to the output level for the heating coil.

11. The cooking apparatus according to claim 9, wherein the processor is configured to determine the common driving frequency and the at least one individual driving frequency for each heating coil of the plurality of heating coils so that power consumption of the cooking apparatus at time points when the common driving frequency is applied and time points when the at least one individual driving frequency for each heating coil of the plurality of heating coils is applied are same as each other.

* * * * *

UNITED STATES PATENT AND TRADEMARK OFFICE
CERTIFICATE OF CORRECTION

| | |
|---|---|
| PATENT NO. | : 12,096,539 B2 |
| APPLICATION NO. | : 17/284705 |
| DATED | : September 17, 2024 |
| INVENTOR(S) | : Namju Park et al. |

Page 1 of 1

It is certified that error appears in the above-identified patent and that said Letters Patent is hereby corrected as shown below:

In the Claims

Column 16, Line 21:
In Claim 3, delete "the the" and insert --the--.

Signed and Sealed this
Seventeenth Day of December, 2024

Derrick Brent
*Acting Director of the United States Patent and Trademark Office*